US008699128B2

(12) United States Patent
Yamashita et al.

(10) Patent No.: US 8,699,128 B2
(45) Date of Patent: Apr. 15, 2014

(54) LASER SCANNING MICROSCOPE

(75) Inventors: Yusuke Yamashita, Tokyo (JP); Tatsuo Nakata, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/899,774

(22) Filed: Oct. 7, 2010

(65) Prior Publication Data

US 2011/0089339 A1  Apr. 21, 2011

(30) Foreign Application Priority Data

Oct. 16, 2009  (JP) ................................. 2009-239247

(51) Int. Cl.
*G02B 21/00* (2006.01)

(52) U.S. Cl.
USPC .......................................... 359/368; 359/512

(58) Field of Classification Search
USPC ..... 359/512; 362/547; 236/44 R, 44 A, 44 C, 236/44 E
See application file for complete search history.

(56) References Cited

U.S. PATENT DOCUMENTS

| 6,844,963 | B2 * | 1/2005 | Iketaki et al. ................. 359/368 |
| 7,382,531 | B2 * | 6/2008 | Tsuchiya et al. .............. 359/395 |
| 7,655,888 | B2 | 2/2010 | Schadwinkel et al. | |
| 2005/0282268 | A1 * | 12/2005 | Kagayama ................ 435/288.7 |
| 2006/0141613 | A1 * | 6/2006 | Tsuchiya et al. ........... 435/288.7 |
| 2006/0237666 | A1 | 10/2006 | Kubo | |
| 2006/0238885 | A1 * | 10/2006 | Hasegawa et al. ............ 359/657 |
| 2007/0065936 | A1 * | 3/2007 | Hasegawa et al. ......... 435/288.7 |
| 2008/0170292 | A1 * | 7/2008 | Harada et al. ................. 359/391 |
| 2008/0247038 | A1 | 10/2008 | Sasaki et al. | |
| 2008/0291963 | A1 | 11/2008 | Deaton, Jr. et al. | |
| 2008/0304145 | A1 * | 12/2008 | Hasegawa ...................... 359/383 |
| 2009/0141746 | A1 * | 6/2009 | Fujikawa et al. ............... 372/10 |
| 2010/0243891 | A1 * | 9/2010 | Day et al. ...................... 250/330 |
| 2011/0032614 | A1 * | 2/2011 | Liedtke et al. ................ 359/512 |

FOREIGN PATENT DOCUMENTS

| EP | 2 085 805 A2 | 8/2009 |
| JP | 11-149045 A | 6/1999 |
| JP | 2000318442 A | * 11/2000 |
| JP | 2004014886 A | * 1/2004 |
| JP | 2008-256927 A | 10/2008 |
| WO | WO 2006129502 A1 | * 12/2006 |

OTHER PUBLICATIONS

Extended European Search Report (EESR) dated Feb. 7, 2011 (in English) in counterpart European Application No. 10013319.8.

* cited by examiner

*Primary Examiner* — Stephone B Allen
*Assistant Examiner* — Jyotsna Dabbi
(74) *Attorney, Agent, or Firm* — Holtz, Holtz, Goodman & Chick, PC

(57) ABSTRACT

A laser scanning microscope includes a culture vessel that accommodates a specimen and is capable of maintaining an interior temperature and humidity thereof, and an optical system space adjacent and optically connected to the culture vessel. The optical system space includes a scanner that two-dimensionally scans ultrashort pulsed laser light across the specimen; an objective lens that focuses the scanned ultrashort pulsed laser light on the specimen and collects light coming from the specimen; a dichroic mirror, disposed between the scanner and the objective lens, that splits off the light coming from the specimen from the laser light; a photodetector that detects the split-off light coming from the specimen; and an outer cover, provided so as to surround the optical system space, that blocks light coming from outside the optical system space.

5 Claims, 3 Drawing Sheets

LASER SCANNING MICROSCOPE

BACKGROUND OF THE INVENTION

1. Field of the Invention

The present invention relates to laser scanning microscopes.

This application is based on Japanese Patent Application No. 2009-239247, the content of which is incorporated herein by reference.

2. Description of Related Art

In the related art, to examine a biological specimen in vivo over an extended period of time, there is a known scanning confocal microscope device that includes a culture vessel for accommodating a specimen at a particular temperature and humidity and an optical system space in which an optical system (such as an objective lens) for examining the specimen is disposed and which is maintained at substantially the same temperature as the interior of the culture vessel (see, for example, Japanese Unexamined Patent Application, Publication No. 2008-256927).

In addition, there is a known multiphoton excitation laser scanning microscope that focuses ultrashort pulsed laser light on the surface of a specimen to increase the photon density near the focal plane thereof so that a fluorescent substance undergoes multiphoton excitation, thereby obtaining a sharp fluorescence image (see, for example, Japanese Unexamined Patent Application, Publication No. HEI-11-149045).

BRIEF SUMMARY OF THE INVENTION

An object of the present invention is to provide a laser scanning microscope that allows stable examination by eliminating the influence of ambient light while inhibiting damage to a specimen and fading of fluorescence.

To achieve the above object, the present invention employs the following solutions.

The present invention employs a laser scanning microscope including a culture vessel accommodating a specimen and capable of maintaining an interior temperature and humidity thereof and an optical system space adjacent to the culture vessel and optically connected to the culture vessel. The optical system space includes a light-scanning section that two-dimensionally scans ultrashort pulsed laser light across the specimen; an objective lens that focuses the ultrashort pulsed laser light scanned by the light-scanning section on the specimen and collects light coming from the specimen; a splitting section, disposed between the light-scanning section and the objective lens, that split off the light coming from the specimen from the laser light; a light-detecting section that detect the light coming from the specimen and split off by the splitting section; and a light-shielding wall, provided so as to surround the optical system space, that blocks light coming from outside the optical system space.

According to the present invention, the specimen accommodated in the culture vessel is maintained in healthy condition over an extended period of time by maintaining a particular temperature and a high humidity in the culture vessel. The ultrashort pulsed laser light scanned by the light-scanning section is focused on the specimen so that fluorescence is emitted by a multiphoton excitation effect, and the fluorescence is collected by the objective lens. The collected fluorescence is split off from the ultrashort pulsed laser light by the splitting section and is detected by the light-detecting section.

By carrying out such two-photon excitation examination, it is possible to inhibit damage to the specimen and fading of fluorescence. In this case, additionally, the light-shielding wall provided around the light-detecting section insulates it from light coming from outside the optical space system (ambient light), thus eliminating the influence of the ambient light and allowing stable examination.

In the above invention, the optical system space may further include an optical-system-space-temperature maintaining section that maintains the optical system space at substantially the same temperature as the interior of the culture vessel.

By doing so, the optical system space is maintained at substantially the same temperature as the interior of the culture vessel by the operation of the optical-system-space-temperature maintaining section provided in the optical system space, thus preventing formation of a temperature gradient due to the temperature of the culture vessel in the optical and mechanical systems in the optical system space. This prevents distortion of the optical and mechanical systems, thus effectively avoiding a decrease in the luminance and sharpness of the resultant image.

In the above invention, the optical system space may be humidity-wise separated from the culture vessel.

If the optical system space is humidity-wise separated from the culture vessel, it is possible to prevent the high humidity in the culture vessel from affecting the optical system, such as the objective lens, and the mechanical system, such as the light-scanning section.

In the above invention, the laser scanning microscope may further include a laser light source that emits the ultrashort pulsed laser light and a laser space accommodating the laser light source and optically connected to the optical system space.

By doing so, the laser space in which the laser light source is disposed and the optical system space in which the light-detecting section etc. are disposed can be separately maintained at appropriate temperature and humidity.

In the above invention, the laser space may include a humidity-reducing section that reduces humidity in the laser space.

The ultrashort pulsed laser light emitted from the laser light source is absorbed in a particular wavelength band (for example, from 900 to 950 nm) by moisture. Accordingly, reducing the humidity in the laser space with the humidity-reducing section inhibits absorption of the ultrashort pulsed laser light in the particular wavelength band by the moisture in the laser space. By doing so, because the wavelength of the ultrashort pulsed laser light can be changed by a bandwidth of ten-some nanometers, the specimen can be well irradiated with ultrashort pulsed laser light having any wavelength without the influence of absorption by moisture, thus improving the examination accuracy for the specimen.

In the above invention, the humidity-reducing section may include a first thermoelectric device that cools air in the laser space and a second thermoelectric device that heats the air cooled by the first thermoelectric device.

The humidity in the laser space can be reduced by cooling air in the laser space with the first thermoelectric device, thereby causing dew, and then heating the cooled air with the second thermoelectric device.

In the above invention, the laser space may include a temperature-controlling section that controls the temperature in the laser space.

By doing so, the laser light source, which generates heat, can be cooled to stably emit the ultrashort pulsed laser light. In addition, the temperature difference between the optical system space and the laser space can be controlled within a predetermined range, thus preventing dewing in the optical system space.

In the above invention, the laser space and the optical system space may be separated, and a fiber that guides the ultrashort pulsed laser light may be provided between the laser space and the optical system space.

By doing so, the size of the main body of the laser scanning microscope can be reduced. In addition, the laser light source can be shared by a plurality of laser scanning microscopes by rerouting the fiber.

In the above invention, the laser scanning microscope may further include a cover that surrounds the light-detecting section and a cooling section that cools the inside of the cover.

By doing so, the light-detecting section disposed inside the cover can be cooled to avoid thermal noise, thus improving the accuracy of detection of the light coming from the specimen by the light-detecting section.

The present invention provides the advantage of allowing stable examination by eliminating the influence of ambient light while inhibiting damage to a specimen and fading of fluorescence.

DETAILED DESCRIPTION OF THE INVENTION

A laser scanning microscope 1 according to an embodiment of the present invention will be described below with reference to FIG. 1.

Figure 1:
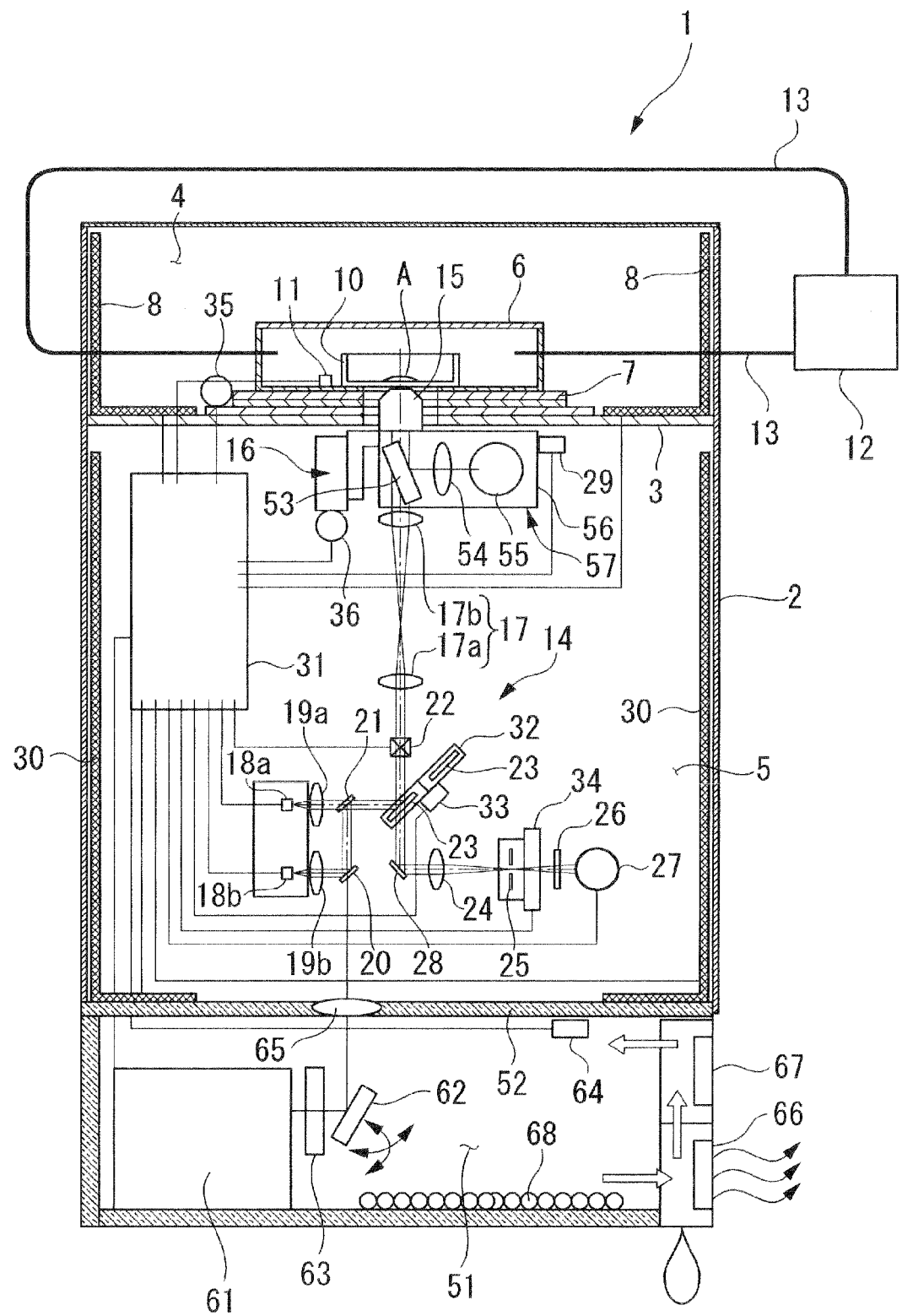
FIG. 1 is an overall configuration diagram showing a laser scanning microscope according to an embodiment of the present invention.

In the laser scanning microscope 1 according to this embodiment, as shown in FIG. 1, the interior of an outer cover (light-shielding wall) 2 formed of a rectangular box-shaped thermal insulator is partitioned into three spaces (examination space 4, optical system space 5, and laser space 51) by partitions 3 and 52 disposed horizontally.

The upper examination space 4 includes a culture vessel 6, a motor-driven stage 7 supporting the culture vessel 6, and a heater 8.

The culture vessel 6 is a vessel accommodating a specimen A and capable of maintaining the interior temperature and humidity thereof. The culture vessel 6 is mounted on the motor-driven stage 7 and is movable by the operation of the motor-driven stage 7, for example, in a horizontal direction.

A through-hole 9 is provided so as to penetrate the bottom surface of the culture vessel 6, the motor-driven stage 7, and the partition 3 in the vertical direction so that the inner space of the culture vessel 6 communicates with the optical system space 5. In addition, the culture vessel 6 accommodates a specimen container 10 accommodating the specimen A and formed of a transparent material, for example, a petri dish having a glass sheet of coverglass-equivalent thickness bonded to a flat bottom surface thereof, or a well plate. The specimen container 10 is disposed at a position overlapping the through-hole 9 provided in the bottom surface of the culture vessel 6 so as to close off the through-hole 9, thus humidity-wise separating the inner space of the culture vessel 6 from the optical system space 5.

A temperature sensor 11 for detecting the temperature in the culture vessel 6 is disposed in the culture vessel 6. In addition, an environment control section 12 for circulating air adjusted to a temperature of 37° C., a humidity of 90% to 100%, and a $CO_2$ concentration of 5% is connected to the culture vessel 6 via a tube 13.

The heater 8, provided on the inner wall surface of the examination space 4, raises the temperature in the examination space 4 to a temperature equivalent to the temperature in the culture vessel 6.

The optical system space 5 is a space adjacent to the culture vessel 6 and optically connected to the culture vessel 6.

A microscope body 14 is disposed in the optical system space 5. The microscope body 14 includes an objective lens 15 disposed below the bottom surface of the specimen container 10 opposite the specimen container 10 at a distance therebetween and having the optical axis thereof oriented in the vertical direction, a focus adjustment mechanism 16 for drive control of the objective lens 15 in the optical axis direction, a scanning optical system 17, a first semiconductor laser 18a that emits laser light having a first wavelength, a second semiconductor laser 18b that emits laser light having a second wavelength, collimating lenses 19a and 19b that convert the laser light coming from the semiconductor lasers 18a and 18b into substantially parallel light, a mirror 20 and a dichroic mirror 21 that merge the laser light into the same optical path, and a scanner (light-scanning section) 22 including a galvanometer mirror that scans the laser light two-dimensionally.

In addition, the microscope body 14 includes dichroic mirrors 23 that reflect the laser light and transmit fluorescence emitted from the specimen A and returning through the objective lens 15, the scanning optical system 17, and the scanner 22; a confocal lens 24 that focuses the fluorescence passing through the dichroic mirrors 23, a confocal pinhole 25 disposed at the focal position of the confocal lens 24, a barrier filter 26 that blocks the laser light contained in the fluorescence passing through the confocal pinhole 25, and a photodetector 27 that detects the fluorescence passing through the barrier filter 26. In the drawings, reference numeral 28 is a mirror.

In addition, the optical system space 5 includes a temperature sensor 29 for detecting the temperature in the optical system space 5 and a heater (optical-system-space-temperature maintaining section) 30 for heating air in the optical system space 5.

In addition, a control unit 31 is disposed in the optical system space 5.

The scanning optical system 17 includes a pupil projection lens 17a for focusing the two-dimensionally scanned light to form an intermediate image and an imaging lens 17b for converting the laser light forming the intermediate image into substantially parallel light and allowing it to enter the objective lens 15.

The plurality of dichroic mirrors 23 are mounted on a rotatable turret 32 so that any dichroic mirror 23 can be selectively positioned in the optical path by the operation of a stepping motor 33.

The confocal pinhole 25 is provided so that the position thereof can be adjusted in two-dimensional directions perpendicular to the optical axis by a pinhole-position driving section 34.

As the dichroic mirrors 23 are switched, the slight angular difference between the individual dichroic mirrors 23 causes a shift in the focal position of the confocal lens 24; therefore, to correct the position of the confocal pinhole 25 for each dichroic mirror 23, the drive position adjusted by the pinhole-position driving section 34 is stored in a memory (not shown) in the control unit 31 in association with each dichroic mirror 23.

The control unit 31 drives the semiconductor lasers 18a and 18b, the scanner 22, the photodetector 27, a motor 35 of the motor-driven stage 7, a motor 36 of the focus adjustment mechanism 16, the stepping motor 33 of the turret 32, and the pinhole-position driving section 34. In addition, when the individual units are driven, they are driven on the basis of adjustable parameters stored in the control unit 31.

Here, the adjustable parameters are control values required for the individual units to operate normally, that is, used to correct manufacturing errors, and accordingly differ from unit to unit.

Specific examples of the adjustable parameters include the relationship between the drive current and the brightness of the semiconductor lasers 18a and 18b, the scan center and the scan width of the scanner 22, the position of the confocal pinhole 25 for each dichroic mirror 23, and the analog offset of the photodetector 27, namely, a photomultiplier tube, and they are set and adjusted while maintaining each site in the optical system space 5 at the temperature in use.

In addition, the setting and adjustment procedure is generally carried out before shipment from a factory, at initial setup of the device at a place of delivery, or during maintenance.

In addition, if the temperature at which the optical system space 5 is maintained can be changed, adjustable parameters optimized for each temperature may be prepared and stored in advance and, in use, adjustable parameters corresponding to the set temperature may be read and used.

In addition, the control unit 31 drives the heaters 8 and 30 on the basis of detection signals from the temperature sensor 11 disposed in the culture vessel 6, the temperature sensor 29 disposed in the optical system space 5, and a temperature sensor 64 (described later) disposed in the laser space 51 and controls the heaters 8 and 30 so that the temperatures detected by the temperature sensors 11 and 29 are 37° C.

A nondescan detection unit 57 for detecting fluorescence coming from the specimen A without the scanner 22 is provided between the scanner 22 and the objective lens 15, more specifically, between the imaging lens 17b and the objective lens 15.

The nondescan detection unit 57 includes a dichroic mirror (splitting section) 53 disposed between the imaging lens 17b and the objective lens 15, an imaging lens 54 for imaging the light reflected by the dichroic mirror 53, and a photodetector 55 for detecting the light imaged by the imaging lens 54. The nondescan detection unit 57 may include a cylindrical light-detecting section cover 56 disposed so as to surround the periphery of the photodetector 55.

The dichroic mirror 53 transmits the laser light scanned by the scanner 22 and reflects the fluorescence coming from the specimen A, thus splitting off the fluorescence coming from the specimen A from the laser light.

The photodetector 55 is, for example, a photomultiplier tube and is disposed inside the outer cover 2.

The outer cover 2 is formed of a material having light-shielding properties and blocks light coming from outside the optical system space 5 (ambient light). This avoids the influence of ambient light on the photodetector 55. Although the light-detecting section cover 56 does not need light-shielding properties, may have light-shielding properties.

Disposed in the laser space 51 are a laser light source 61 for two-photon excitation examination, a mirror 62 provided so as to be rotatable, an acousto-optic modulator (AOM) 63 provided between the laser light source 61 and the mirror 62, and a temperature sensor 64.

The laser light source 61 emits ultrashort pulsed laser light such as femtosecond pulsed laser light.

The mirror 62 is alignable, and changing the angle of the mirror 22 allows it to reflect the ultrashort pulsed laser light coming from the laser light source 61 so that it enters an optical window 65, described later.

The partition 52 partitioning the optical system space 5 and the laser space 51 has an optical window 65 for optically connecting the optical system space 5 and the laser space 51. This allows the ultrashort pulsed laser light emitted from the laser light source 61 to pass through the optical window 65 via the acousto-optic modulator 63 and the mirror 62 so that the light is directed to the mirror 20 in the optical system space 5. The ultrashort pulsed laser light directed to the mirror 20 passes through the mirror 20 and is reflected by the dichroic mirror 21. Thus, the ultrashort pulsed laser light emitted from the laser light source 61 passes through the same optical path as the laser light coming from the semiconductor lasers 18a and 18b.

In addition, a Peltier device (first thermoelectric device) 66 for cooling air in the laser space 51 and a Peltier device (second thermoelectric device) 67 for heating the air cooled by the Peltier device 66 are provided in the laser space 51. Specifically, the Peltier devices 66 and 67 are controlled so that, for example, the humidity in the laser space 51 is adjusted to 10% or less and the temperature is adjusted to 22±2° C.

The humidity in the laser space 51 can be reduced by cooling air in the laser space 51 with the Peltier device 66, thereby causing dew, and then heating the cooled air with the Peltier device 67. That is, the Peltier devices 66 and 67 function as a humidity-reducing section for reducing the humidity in the laser space 51.

Here, the ultrashort pulsed laser light emitted from the laser light source 61 is absorbed in a particular wavelength band (for example, from 900 to 950 nm) by moisture. Accordingly, reducing the humidity in the laser space 51 with the Peltier devices 66 and 67 inhibits absorption of the ultrashort pulsed laser light in the particular wavelength band by the moisture in the laser space 51. By doing so, because the wavelength of the ultrashort pulsed laser light can be changed by a band width of ten-some nanometers, the specimen A can be well irradiated with the ultrashort pulsed laser light at any wavelength without the influence of absorption by moisture, thus improving the examination accuracy for the specimen A. As shown in FIG. 1, a desiccant 68 such as silica gel can be disposed in the laser space 51 to improve the dehumidification effect in the laser space 51.

In addition, the Peltier devices 66 and 67 function as a temperature-controlling section for controlling the temperature in the laser space 51. Thus, the laser light source 61, which generates heat, can be cooled to stably emit the ultrashort pulsed laser light. In addition, the temperature difference between the optical system space 5 and the laser space 51 can be controlled within a predetermined range, thus preventing dewing in the optical system space 5.

The operation of the thus-configured laser scanning microscope 1 according to this embodiment will be described below.

First, single-photon excitation examination using the semiconductor lasers 18a and 18b will be described.

To examine the specimen A using the laser scanning microscope 1 according to this embodiment, with the specimen A, such as a living cell, adhering to the bottom surface of the specimen container 10, the specimen container 10 is accommodated in the culture vessel 6 so that the bottom surface of the specimen container 10 closes off the through-hole 9 of the motor-driven stage 7.

In this state, the environment control section 12 is operated to circulate air suitable for the incubation environment, that is, air at a temperature of 37° C., a humidity of 100%, and a $CO_2$ concentration of 5%, in the culture vessel 6.

In addition, the control unit 31 is operated to heat the interior of the culture vessel 6 and the optical system space 5 by the operation of the heaters 8 and 30 so that the temperature sensors 11 and 29 read 37° C.

While the interior of the examination space 4 and the optical system space 5 are maintained at 37° C., laser light is emitted by operating the semiconductor lasers 18a and 18b, is reflected by the dichroic mirrors 23, is two-dimensionally scanned by the scanner 22, and is focused by the pupil projection lens 17a, the imaging lens 17b, and the objective lens 15 so that the laser light irradiates the specimen A placed on the bottom surface of the specimen container 10.

A fluorescent substance is excited to emit fluorescence at each position irradiated with the laser light on the specimen A. The emitted fluorescence is collected by the objective lens 15, is returned via the imaging lens 17b, the pupil projection lens 17a, and the scanner 22, is split off from the laser light by the dichroic mirrors 23, and is focused by the confocal lens 24. Of the focused fluorescence, only fluorescence emitted from the focal plane of the objective lens 15 passes through the confocal pinhole 25 and is detected by the photodetector 27.

Because information about the luminance of the fluorescence detected by the photodetector 27 is input to the control unit 31, the luminance information can be stored in association with information about the scanning position of the scanner 22 when the luminance information is detected, thus obtaining a two-dimensional frame image.

Next, two-photon excitation examination using the laser light source 61 will be described.

First, the control unit 31 is operated to heat the interior of the culture vessel 6 and the optical system space 5 by the operation of the heaters 8 and 30 so that the temperature sensors 11 and 29 read 37° C. In addition, the Peltier devices 66 and 67 are operated to control the humidity in the laser space 51 to 10% or less and the temperature to 22±2° C.

In this state, when ultrashort pulsed laser light is emitted by operating the laser light source 61, the ultrashort pulsed laser light passes through the optical window 65 via the acousto-optic modulator 63 and the mirror 62 and is directed to the mirror 20 in the optical system space 5. The ultrashort pulsed laser light then passes through the mirror 20, is reflected by the dichroic mirrors 23, and is two-dimensionally scanned by the scanner 22. Subsequently, the ultrashort pulsed laser light is focused by the pupil projection lens 17a, the imaging lens 17b, and the objective lens 15 so that the ultrashort pulsed laser light irradiates the specimen A placed on the bottom surface of the specimen container 10.

A fluorescent substance is excited by a two-photon excitation effect to emit fluorescence at the focal position irradiated with the laser light on the specimen A. The emitted fluorescence is collected by the objective lens 15, is reflected by the dichroic mirror 53, and is detected by the photodetector 55 via the imaging lens 54.

Because information about the luminance of the fluorescence detected by the photodetector 55 is input to the control unit 31, the luminance information can be stored in association with information about the scanning position of the scanner 22 at the time when the luminance information is detected, thus obtaining a two-dimensional frame image.

As described above, the fluorescence emitted from the specimen A can be detected by the photodetector 55 without being returned to the scanner 22 to minimize signal attenuation at the individual optical components, thus improving the S/N ratio of the two-photon fluorescence. Here, although nondescan detection cannot split off only the two-photon fluorescence emitted from the focal plane on the specimen A using a confocal pinhole, an optical sectional image of the specimen A can be obtained without a confocal pinhole because fluorescence due to two-photon excitation occurs only in close proximity to the position at which the ultrashort pulsed laser light is focused (focal position).

As described above, in the laser scanning microscope 1 according to this embodiment, the specimen A accommodated in the culture vessel 6 is maintained in healthy condition over an extended period of time by maintaining a temperature of about 37° C. and a humidity of 90% to 100% in the culture vessel 6. The ultrashort pulsed laser light scanned by the scanner 22 is focused on the specimen A so that fluorescence is emitted by a multiphoton excitation effect, and the fluorescence is collected by the objective lens 15. The collected fluorescence is split off from the ultrashort pulsed laser light by the dichroic mirror 53 and is detected by the photodetector 55.

By carrying out such two-photon excitation examination, it is possible to inhibit damage to the specimen A and fading of fluorescence. In this case, additionally, the outer cover 2 provided around the photodetector 55 insulates it from light coming from outside the optical space system 5 (ambient light), thus eliminating the influence of the ambient light and allowing stable examination.

In addition, because the heater 30 for maintaining the optical system space 5 at substantially the same temperature as the interior of the culture vessel 6 is provided in the optical system space 5, the optical system space 5 is maintained at substantially the same temperature as the interior of the culture vessel 6, thus preventing formation of a temperature gradient due to the temperature of the culture vessel 6 in the optical and mechanical systems in the optical system space 5. This prevents distortion of the optical and mechanical systems, thus effectively avoiding a decrease in the luminance and sharpness of the resultant image.

In addition, because the optical system space 5 is humidity-wise separated from the culture vessel, it is possible to prevent the high humidity in the culture vessel 6 from affecting the optical system, such as the objective lens 15, and the mechanical system, such as the scanner 22.

Figure 2:
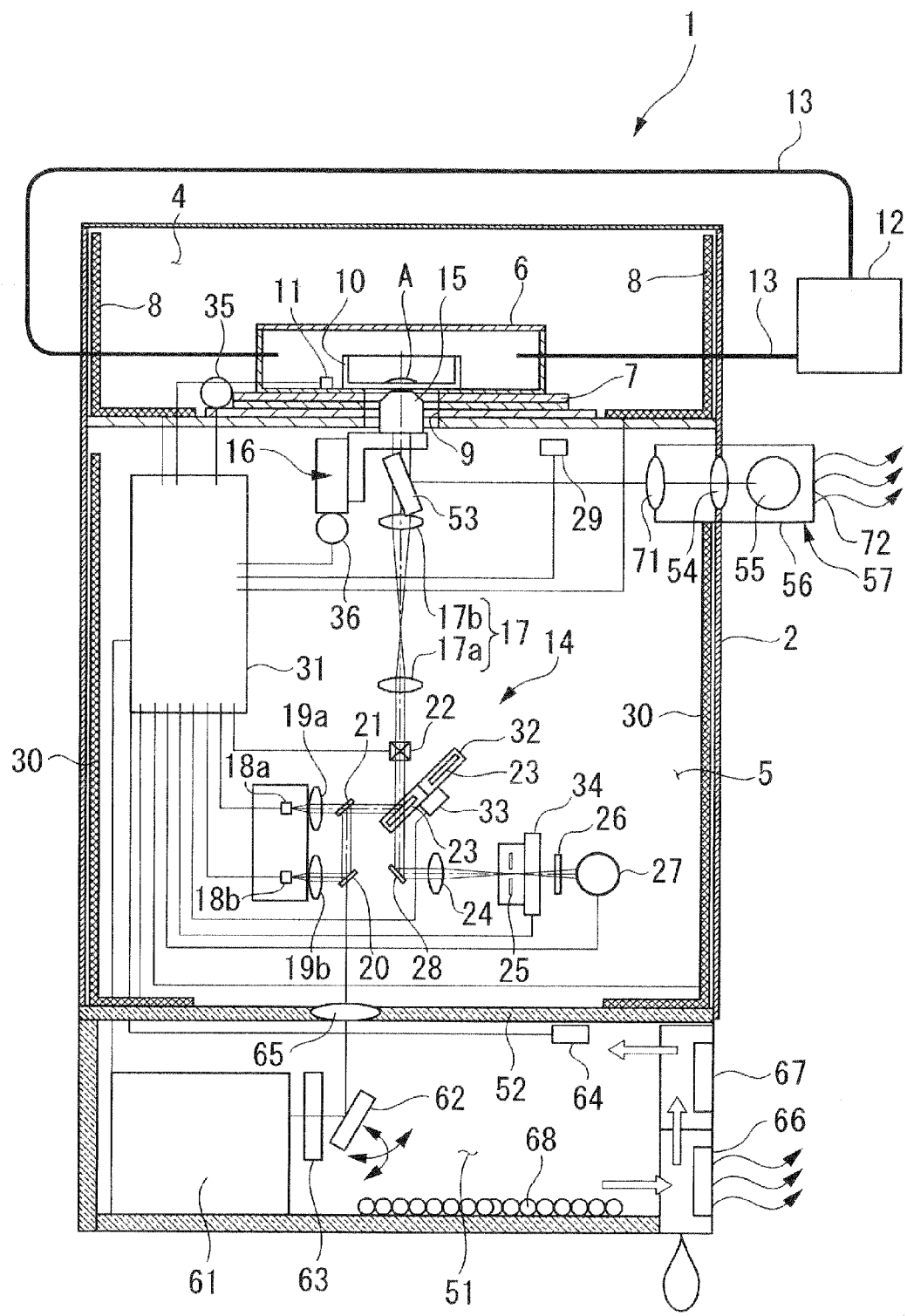
FIG. 2 is an overall configuration diagram showing a first modification of the laser scanning microscope in FIG. 1.

As a first modification of the laser scanning microscope 1 according to this embodiment, as shown in FIG. 2, a portion of the nondescan detection unit 57 (light-detecting section cover 56) may protrude outside the outer cover 2, the light-detecting section 55 and a Peltier device (cooling section) 72 may be provided in the protruding portion, and may exhaust the heat from t the light-detecting section 55. In this case, the light-detecting section cover 56 should have light-shielding properties, insulates the light-detecting section 55 from ambient light.

In the laser scanning microscope 1 according to this modification, the photodetector 55 disposed inside the light-detecting section cover 56 can be cooled to avoid thermal noise, thus improving the accuracy of detection of the light coming from the specimen A by the photodetector 55.

Figure 3:
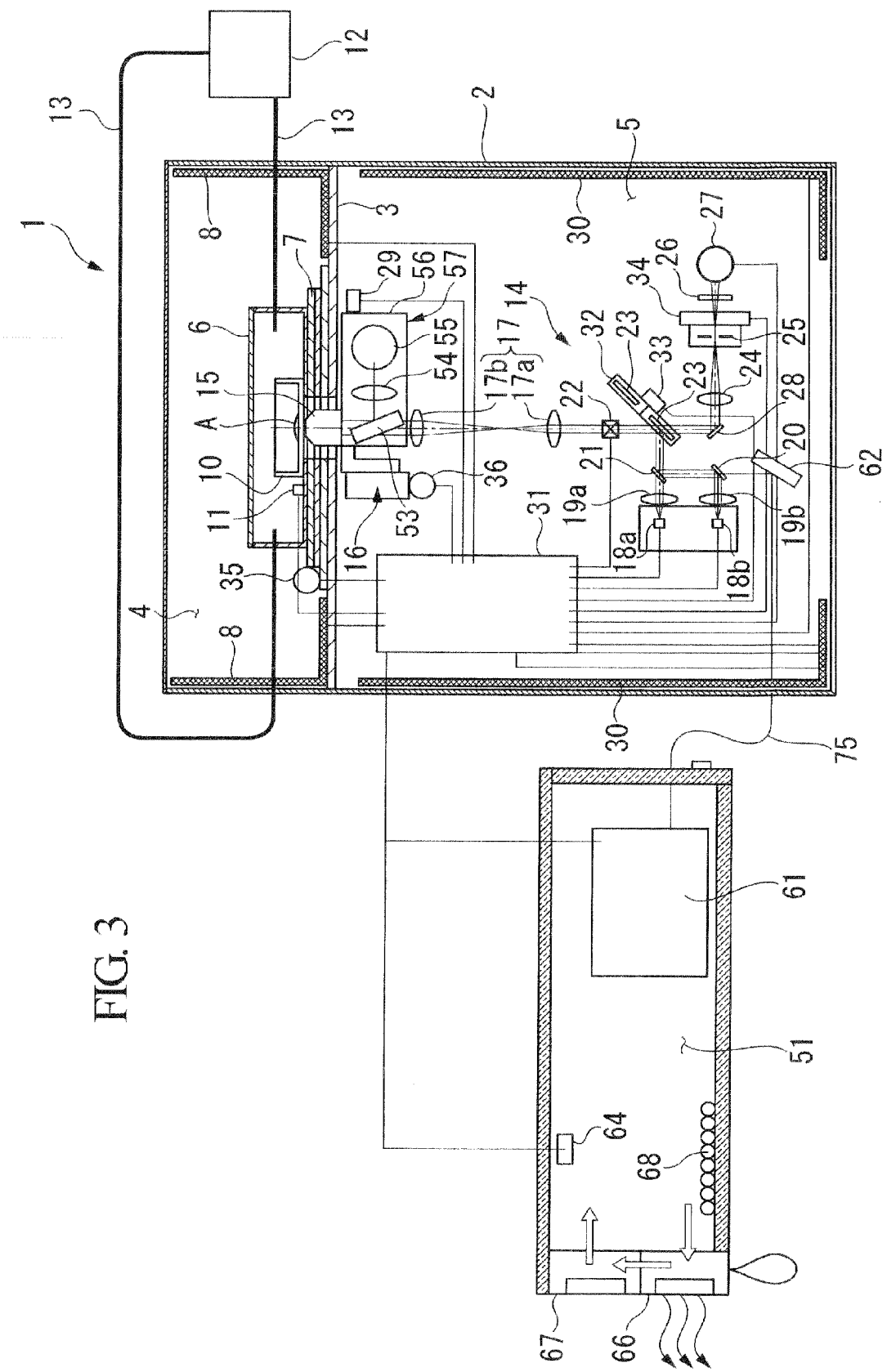
FIG. 3 is an overall configuration diagram showing a second modification of the laser scanning microscope in FIG. 1.

In addition, as a second modification of the laser scanning microscope 1 according to this embodiment, as shown in FIG. 3, the laser space 51 and the optical system space 5 may be separated, and a fiber 75 for guiding ultrashort pulsed laser light may be provided between the laser space 51 and the optical system space 5.

By doing so, the size of the main body of the laser scanning microscope 1 (the examination space 4 and the optical system space 5) can be reduced. In addition, the laser light source 61 can be shared by a plurality of laser scanning microscopes 1 by rerouting the fiber 75.

In the laser scanning microscopes 1 according to the embodiment and modifications described above, the Peltier device 66 for dehumidification may be omitted, and the desiccant 68 and the Peltier device 67 for temperature adjustment may be disposed in the laser space 51.

In this case, the desiccant 68 reduces the humidity of the air in the laser space 51, whereas the Peltier device 67 adjusts the temperature of the air to 22±2° C.

What is claimed is:

1. A laser scanning microscope comprising:
    a laser light source that emits ultrashort pulsed laser light;
    a culture vessel that accommodates a specimen, wherein the culture vessel is capable of maintaining an interior temperature and humidity thereof;
    an optical system space adjacent to the culture vessel and optically connected to the culture vessel; and
    a laser space that accommodates the laser light source and is optically connected to the optical system space,
    wherein the optical system space includes:
        a light-scanning section that two-dimensionally scans the ultrashort pulsed laser light across the specimen;
        an objective lens that focuses the ultrashort pulsed laser light scanned by the light-scanning section on the specimen and collects light coming from the specimen which is fluorescence emitted by two-photon excitation on the specimen;
        a splitting section, disposed between the light-scanning section and the objective lens, that splits off the light coming from the specimen from the laser light;
        a light-detecting section that detects the light coming from the specimen and split off by the splitting section;
        a light-shielding wall, provided so as to surround the optical system space, that blocks light coming from outside the optical system space; and
        an optical-system-space-temperature maintaining section that maintains the optical system space at substantially a same temperature as the interior of the culture vessel, and
    wherein:
        the optical system space is humidity-wise separated from the culture vessel,
        the laser space includes a humidity-reducing section that reduces humidity in the laser space, and a temperature-controlling section that controls a temperature in the laser space, and
        the laser space is an enclosed space that is directly adjacent to the optical system space and optically connected to the optical system space through an optical window, and is maintained at a temperature that is lower than the temperature of the optical system space by the temperature-controlling section.

2. The laser scanning microscope according to claim 1, wherein the humidity-reducing section includes a first thermoelectric device that cools air in the laser space and a second thermoelectric device that heats the air cooled by the first thermoelectric device.

3. The laser scanning microscope according to claim 1, further comprising:
    a cover that surrounds the light-detecting section; and
    a cooling section that cools an inside of the cover.

4. The laser scanning microscope according to claim 1, wherein the laser space and the optical system space share a wall.

5. The laser scanning microscope according to claim 1, wherein the laser space is surrounded by a wall.

* * * * *